US010626971B2

(12) United States Patent
Wyser

(10) Patent No.: US 10,626,971 B2
(45) Date of Patent: Apr. 21, 2020

(54) HYDRAULIC TORQUE CONVERTER

(71) Applicant: Gino Minichiello, Oberägeri (CH)

(72) Inventor: Hans Ulrich Wyser, Oftringen (CH)

(73) Assignee: Gino Minichiello, Oberageri (CH)

( * ) Notice: Subject to any disclaimer, the term of this patent is extended or adjusted under 35 U.S.C. 154(b) by 142 days.

(21) Appl. No.: 15/543,065

(22) PCT Filed: Jan. 13, 2015

(86) PCT No.: PCT/EP2015/050446
§ 371 (c)(1),
(2) Date: Jul. 12, 2017

(87) PCT Pub. No.: WO2016/112955
PCT Pub. Date: Jul. 21, 2016

(65) Prior Publication Data
US 2018/0003278 A1   Jan. 4, 2018

(51) Int. Cl.
*F16H 39/24*   (2006.01)
*F16H 41/00*   (2006.01)

(52) U.S. Cl.
CPC ............. *F16H 39/24* (2013.01); *F16H 41/00* (2013.01)

(58) Field of Classification Search
CPC ...... F16H 39/22; F16H 39/24; F01C 21/0854; F01C 21/0863
See application file for complete search history.

(56) References Cited

U.S. PATENT DOCUMENTS

| 1,697,041 | A | * | 1/1929 | Balsiger | F01C 21/0863 418/24 |
| 2,238,062 | A | * | 4/1941 | Kendrick | F04C 14/20 417/218 |
| 2,384,218 | A | | 9/1945 | Tucker | |
| 2,612,114 | A | * | 9/1952 | Ernst | F01C 21/0863 418/26 |
| 2,631,544 | A | * | 3/1953 | Wilcox | F01C 21/0809 418/131 |
| 2,646,003 | A | * | 7/1953 | Ferris | F04C 14/20 418/31 |

(Continued)

FOREIGN PATENT DOCUMENTS

| DE | 1936181 A1 | 1/1971 |
| DE | 1962613 A1 | 6/1971 |

(Continued)

*Primary Examiner* — Thomas E Lazo
*Assistant Examiner* — Matthew Wiblin
(74) *Attorney, Agent, or Firm* — Browdy and Neimark, P.L.L.C.

(57) ABSTRACT

A hydraulic torque converter comprises a housing (G), in which two vane cell stator/rotor sets (SR1, SR2) are arranged one behind the other. The two sets are in hydraulically communicating connection with one another. The rotors (6, 6') are connected to a driveshaft (P) or an output shaft (M). The stators (7, 7') are at a spacing from the associated rotors (6, 6'), and the spacing can be varied in at least one radial direction on the basis of pressure and/or centrifugal force, wherein means (75, 76, 77) are present in order to regulate the spacing from the associated rotor (6, 6'). This enables an inexpensive production of a continuously variable transmission which is, in addition, easy to regulate and has an optimized transmission of force.

8 Claims, 5 Drawing Sheets

(56) References Cited

U.S. PATENT DOCUMENTS 3,740,954 A    6/1973   Young
3,808,814 A    5/1974   Macy

FOREIGN PATENT DOCUMENTS

| DE | 2431555 | A1 | | 1/1976 | |
|----|---------|----|----|--------|-------------|
| DE | 2600160 | A1 | * | 7/1977 | ............ F16H 39/32 |
| DE | 19710976 | A1 | * | 9/1998 | ............ B60T 17/02 |
| EP | 0259590 | A1 | | 3/1988 | |
| EP | 1001172 | A1 | | 5/2000 | |
| FR | 2530769 | A1 | | 1/1984 | |
| GB | 853667 | A | | 11/1960 | |
| GB | 2167164 | A | | 5/1986 | |

* cited by examiner

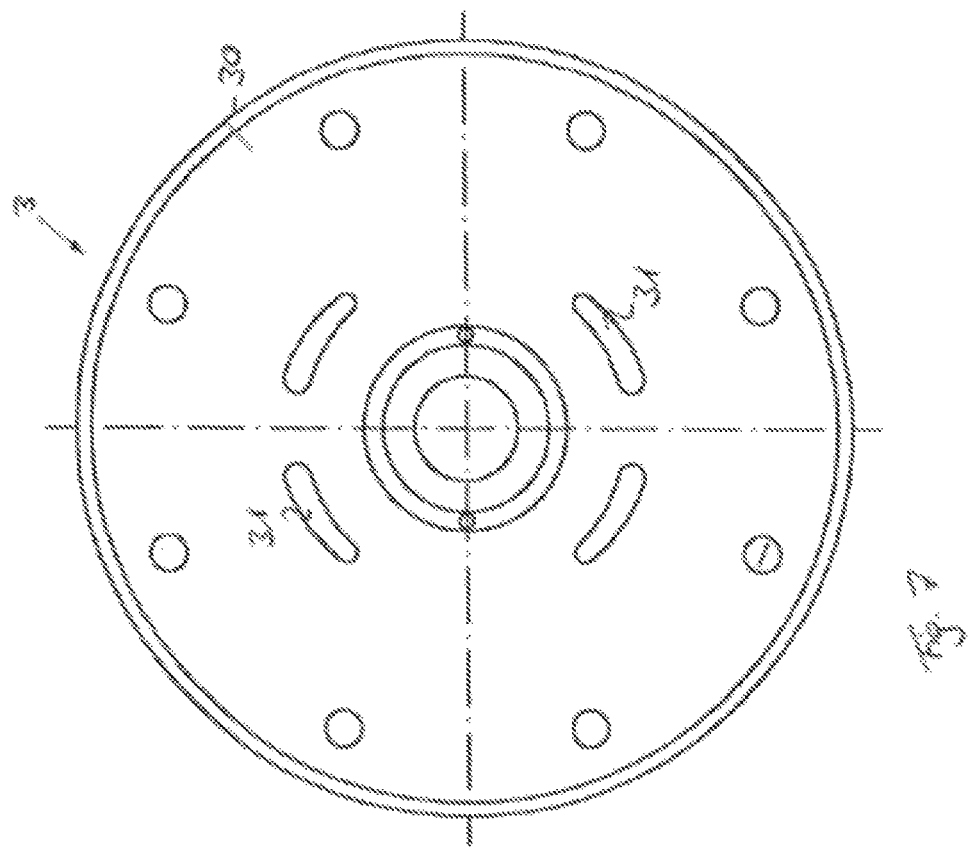
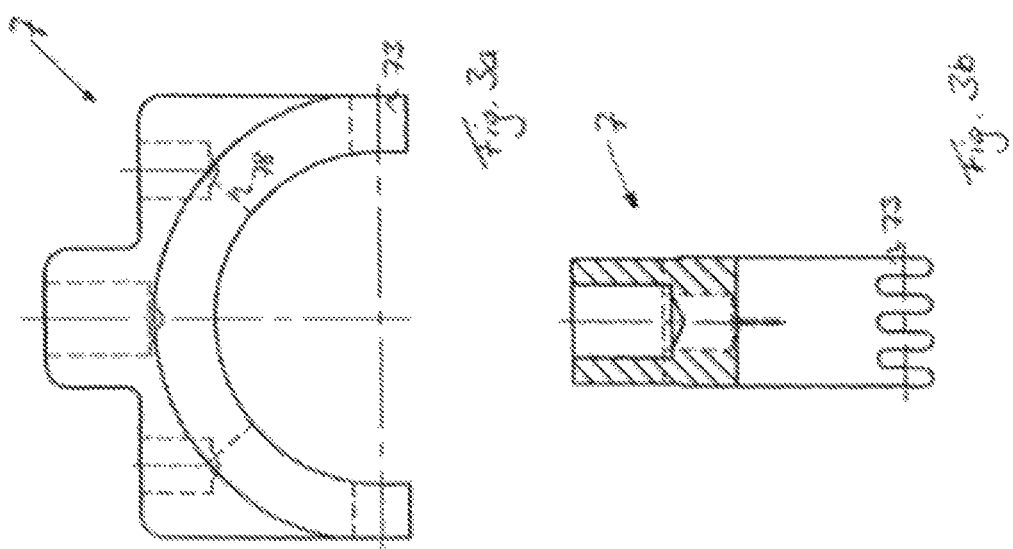

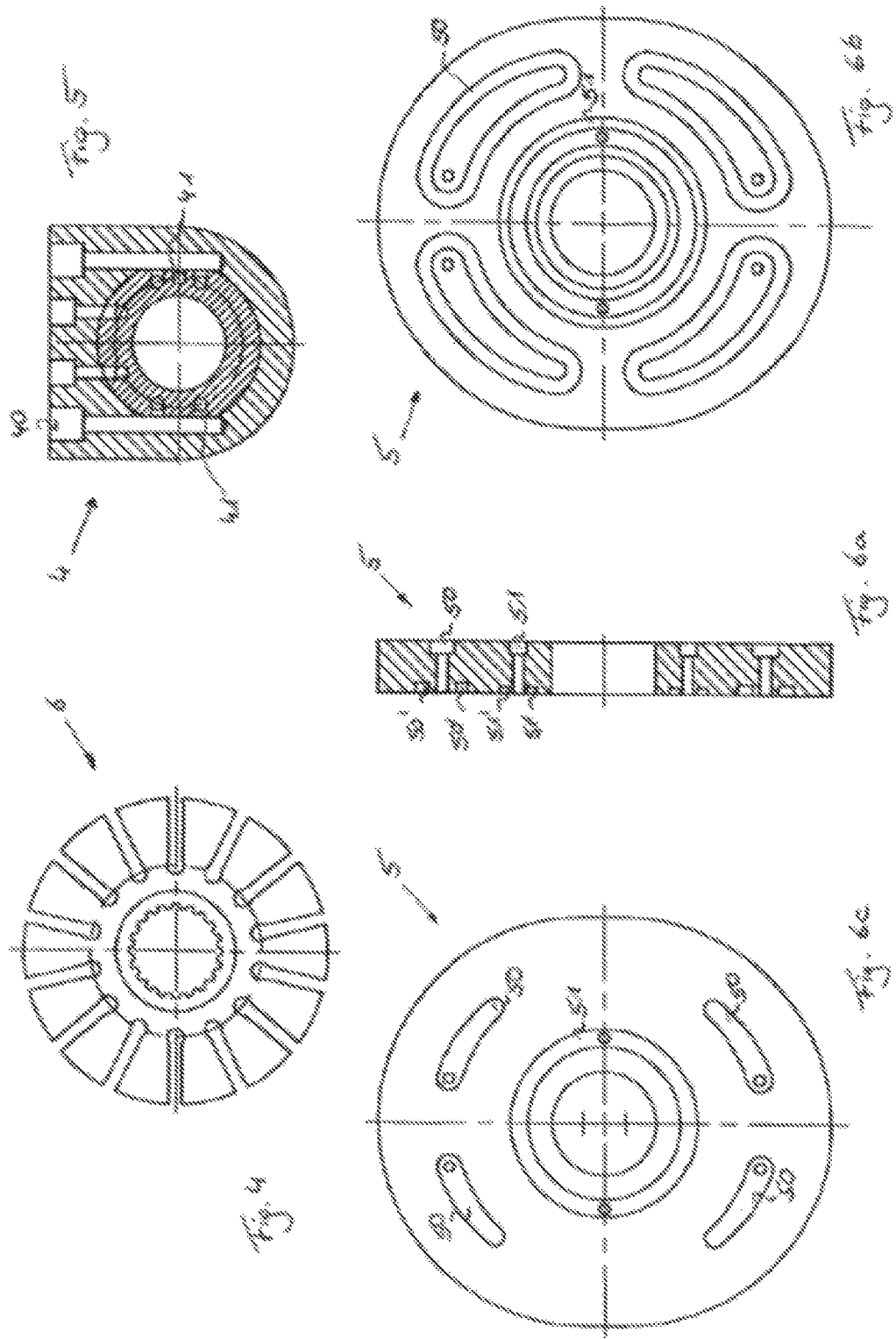

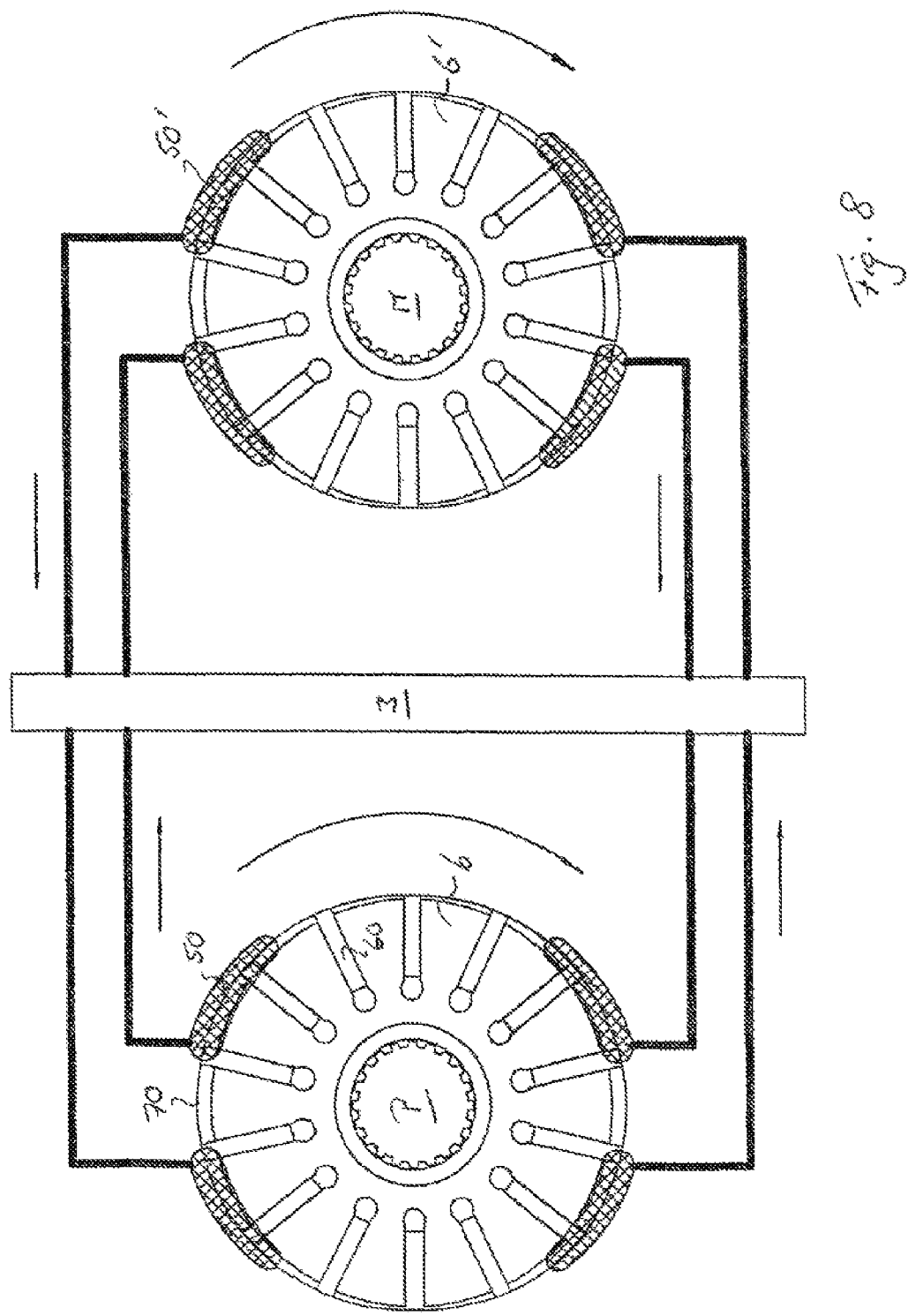

HYDRAULIC TORQUE CONVERTER

TECHNICAL FIELD

The invention relates to a hydraulic torque converter according to the preamble of Claim 1.

PRIOR ART

In the torque converters or transmissions that are conventionally used, the transmission of force from a driveshaft to an output shaft occurs via gears, couplings or intermediate shafts. These transmissions are relatively expensive due to the complicated mechanical system and the highly resistant material, and, in addition, they are quite heavy.

Therefore, different continuously variable transmissions are known, in which the transmission of the torque occurs by means of a fluid. For instance, DE 2 431 555 discloses a hydrodynamic transmission, in which an oil flow generated by a pump driven by an engine is converted into a rotating movement. EP A 0 259 590 describes an adjustable hydrostatic transmission with a radially incorporated pump/motor unit with reciprocally adjustable conveyed volumes. DE A 1 962 613 discloses a hydrostatic transmission, in which the pump and the motor are designed as a vane cell pump and a vane cell motor, respectively. Here too, the pump and the motor are arranged radially one inside the other in a cylinder. Here, the cylinder has an outer running surface and an inner running surface, which are arranged eccentrically, in order to regulate the conveyed quantity and thus the torque.

However, these hydraulic transmissions are constructed in a relatively complicated way, are difficult to regulate, and have a relatively low power transfer.

Furthermore, from EP 1 001 172, a vane cell pump is known, which comprises a stator which is mounted within a bearing housing in such a manner that it is adjustable radially with respect to a driveshaft.

DESCRIPTION OF THE INVENTION

The aim of the invention is to produce a hydraulic torque converter which can be produced cost effectively and which is easy to regulate.

This aim is achieved by a hydraulic torque converter with the features of Claim 1.

The torque converter according to the invention comprises at least two vane cell stator/rotor sets which are arranged one behind the other in the axial direction, wherein the spacing of at least one of the stators, and preferably all of the stators from the respective associated rotor can be varied in at least one radial direction on the basis of pressure and/or centrifugal force, thereby varying the size of the pump chamber. By regulating this variation, a continuously variable transmission can be produced. Varying the radial spacing brings about a variation of the conveyed quantity of the pump fluid which can be conveyed through the pump chambers and thus a variation of the drive of the second stator/rotor set.

In a preferred embodiment, the variable stator consists of at least two parts which can be made to engage in one another via indentations.

The regulation of the spacing of the stator from the rotor and thus the regulation of the torque transmitted by a driveshaft to an output shaft occurs according to the invention, on the one hand, by means of return springs, which apply force to the stator in a radial direction toward the axis of the shafts, and, on the other hand, by means of regulator pistons, which, in the case of accelerations and decelerations of the torque converter, act on the stator and vary the pump chamber in terms of the size thereof.

The device according to the invention has a small construction size, a relatively small deadweight, and an optimally adaptable transmission of force.

Additional advantageous embodiments can be obtained from the dependent claims.

BRIEF DESCRIPTION OF THE DRAWINGS

Below, the subject matter of the invention is explained by means of preferred exemplary embodiments which are represented in the accompanying drawings.

FIG. 3a shows a view of a first part of a stator according to the invention;

FIG. 3b shows a partial section of a detail according to FIG. 3a;

FIG. 4 shows a view of a rotor;

FIG. 5 shows a cross section through a control pump;

FIG. 6a shows a cross section through a pump-side control plate;

FIG. 6b shows a view of the control plate according to FIG. 6a from a first side;

FIG. 6c shows a view of the control plate according to FIG. 6a from a second side;

FIG. 7 shows a view of a control housing, and

FIG. 8 shows a diagrammatic representation of the torque converter according to the invention in the state of acceleration.

METHODS FOR CARRYING OUT THE INVENTION

Figure 1:
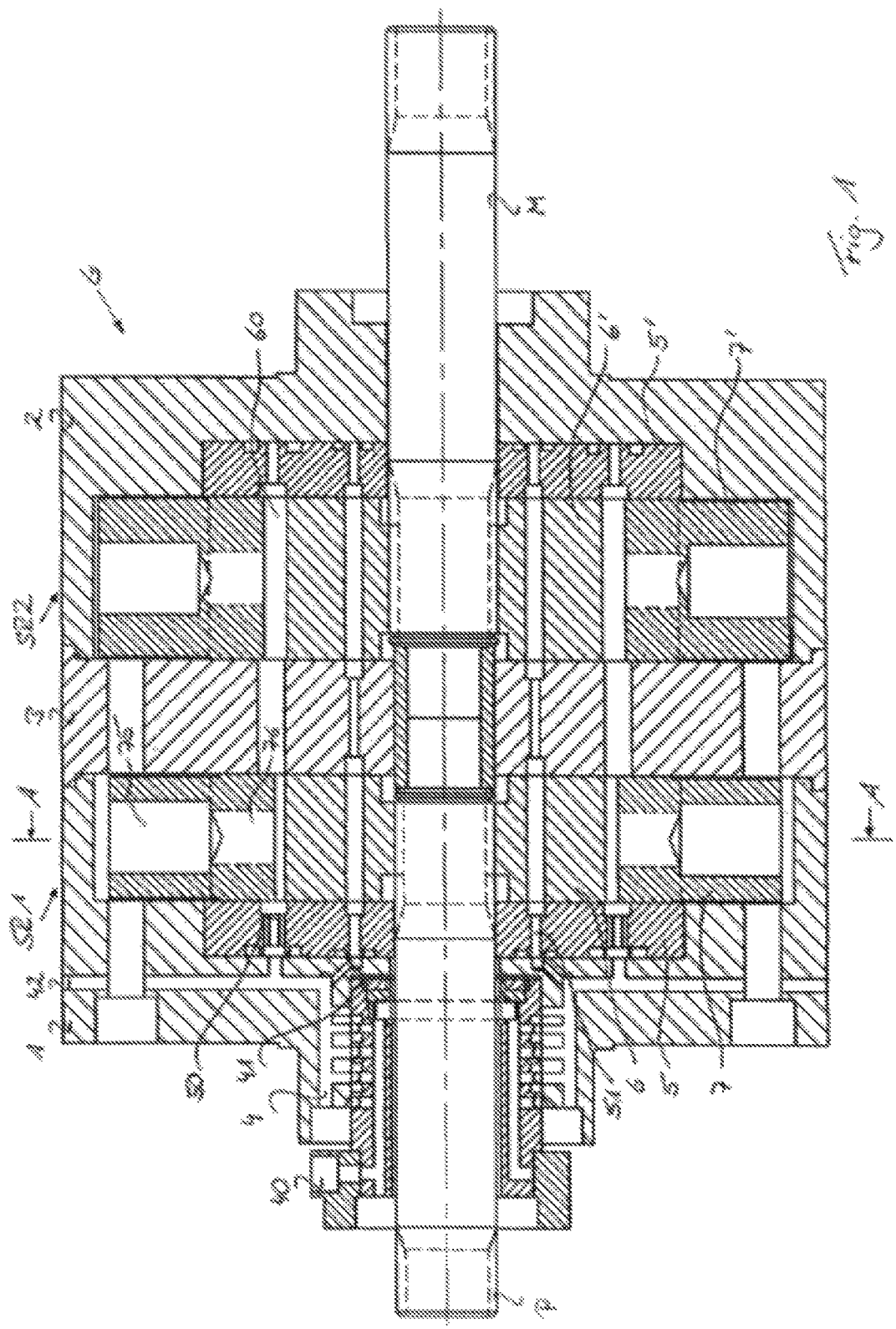
FIG. 1 shows a longitudinal section through a torque converter according to the invention.

In FIG. 1, a continuously variable hydraulic torque converter according to the invention, also referred to as a cell converter, is represented. It comprises a housing G, which is passed through on one side by a driveshaft or pump shaft P and on the other side by an output shaft or motor shaft M. The two shafts approach one another in the center of the housing G, without, however, being connected to one another. They form a common axis.

In the housing G, at least two, here exactly two, vane cell stator/rotor sets SR1, SR2 with outer vane piston support are arranged. They are arranged one behind the other in the axial direction and are preferably constructed identically. The first vane cell stator/rotor set SR1 forms a vane cell pump and is mounted in a pump housing 1; the second vane cell stator/rotor set SR2 forms a vane cell motor and is mounted in a motor housing 2. The two housings 1, 2 are constructed substantially mirror symmetrically, wherein, depending on the desired transmission ratio, the vane cell motor has a greater mass than the vane cell pump. The example represented here is suitable for trucks. Between the pump housing 1 and the motor housing 2, a control housing 3 is arranged.

In the pump housing 1, a control pump 4 is arranged, which is passed through by the driveshaft P. This control pump 4 is represented in cross section in FIG. 5. It has inlet openings 40, in order to lead a pump fluid, preferably oil, from outside into the control pump 4, and outlet openings 41, in order to lead the oil into the first stator/rotor set RS1. Furthermore, a control channel 42 is present. This control pump 4 generates and regulates the control pressure needed when starting up the converter.

The basic principle is as follows: The driveshaft P drives a rotor 6 of the first stator/rotor set SR1. This rotor set transfers the torque to the pressurized pump fluid, which drives the rotor 6' of the second stator/rotor set SR2, which in turn is rigidly connected to the output shaft M. By regulating the quantity of pump fluid, a continuously variable transmission can be produced. According to the invention, this regulation occurs, as explained in greater detail below, by means of a variation, on the basis of pressure and/or centrifugal force, of the spacing between rotor 6 and stator 7. Because the two stators 7, 7' of the two sets can be opened differently by means of the regulation, any desired transmission can be set.

The pump housing 1 has a substantially round outer periphery. In the interior, the housing 1 has a hollow space subdivided into two stages. The stage adjacent to the control pump 4 has a flattened circular shape and is used for the rotationally fixed accommodation of a pump-side pressure plate 5 with a control function. The pressure plate ensures a gap-free sealing between rotor and stator. The second stage has a substantially rectangular cross section, wherein it is extended in longitudinal direction by means of two mutually facing noses 10. This can be seen in FIG. 2. The first vane cell stator/rotor set SR1 is arranged in this stage.

As can be seen again in FIG. 1, the control housing 3 follows with a positionally fixed central control plate 30 represented in FIG. 7. This is followed by the motor housing 2, which also has two stages and which is constructed symmetrically with respect to the pump housing 1, except for the absence of a recess for a control pump. Here, the second stator/rotor set SR2 is arranged adjacent to the control plate 30, and is followed by a motor-side pressure plate 5', arranged in a rotationally fixed manner, the construction of which is preferably identical to that of the pump-side pressure plate 5. The output shaft M passes through the motor housing 2.

Figure 2:
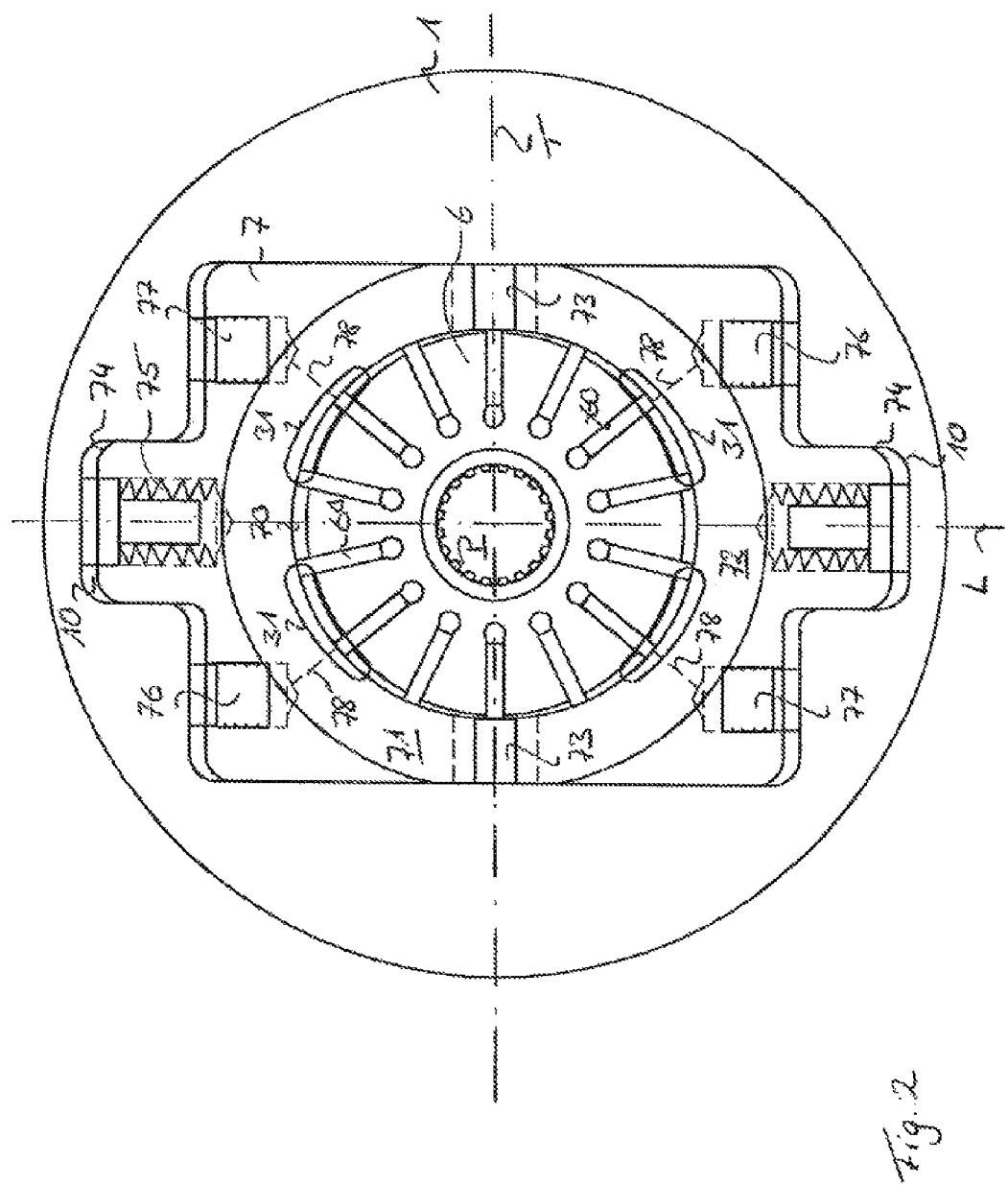
FIG. 2 shows a cross section through the torque converter according to FIG. 1 along A-A.

In FIG. 2, a cross section through the pump housing 1 is represented. The cross section through the corresponding site in the motor housing 2 would be identical. The pump stator 7 of the stator/rotor set SR1 has the same cross section as the second stage of the pump housing 1, but it is designed to be shorter. Preferably, the difference and thus the maximum displacement path is 5-10 mm. The stator 7 has an at least approximately circular central opening with an inner running surface 70, in which the associated rotor 6 is arranged. A single view of a rotor 6 can be seen in FIG. 4. The rotor 6 here sits on the driveshaft P, the outer periphery of which is indented. For this purpose, the pump rotor 6 has an accommodation opening for the driveshaft P, which is also indented in this area. The pump rotor 6 is driven by means of the driveshaft P.

The rotor 6 has several recesses evenly distributed over the periphery, in which piston-shaped vane pistons 60 are mounted in a radially displaceable manner. By means of these vane pistons 60, the rotor 6 runs on the inner running surface 70 of the stator 7, wherein the pump fluid is pumped from a drive-side aspiration side of the stator/rotor set SR1 to the facing pressure side of the set SR1. Pump fluid located between stator 7 and rotor 6 is also forced by the rotating movement of the rotor 6 into a circular path.

According to the invention, the stator 7 can now be varied in terms of the spacing thereof from the rotor 6 by means of the oil pressure and/or by means of the Coriolis force or centrifugal force generated by the rotation of the oil. For this purpose, the stator 7, which is preferably fabricated from metal or from another rigid material, consists of at least two parts. One of said parts is represented in FIG. 3a. In the example described here, the stator 7 consists of exactly two parts 71, 72 which are constructed substantially mirror symmetrically with respect to one another, and the position of which with respect to one another can be varied on the basis of pressure and/or centrifugal force. In the process, the circular shape of the running surface 70 is spread apart in two diagonally opposite directions. In FIG. 2, a slightly spread apart position is represented. Each of the parts 71, 72 comprises, as can be seen in FIG. 3b, diagonally opposite indentations 73, which can be brought into engagement with indentations of the adjacent part or other part. Thereby, the stator 7 can be pulled apart and pulled together again under guidance due to pressure and/or centrifugal force.

The torque converter according to the invention moreover comprises means for regulating and limiting this movement. On the one hand, for this purpose, in the nose 74 of the stator 7, a return spring 75 is arranged, which applies force to the stator in a radial direction toward the axis of the driveshaft P. On the other hand, on both sides of the nose, likewise in the shorter side of the stator 7, a respective regulator piston 76, 77 is arranged. In the area of these regulator pistons 76, 77, the stator 7 has radially extending regulation passage openings 78 hydraulically connecting the piston 76, 77 to a chamber formed by the spacing between rotor 6 and stator 7. If, as represented here, exactly two parts 71, 72 are present, then in each case two regulation passage openings 78 per part and in each case two associated regulator pistons 76, 77 are sufficient. Preferably, each opening 78 of a part 71, 72 has a diagonally opposite counterpart in the other part 71, 72. In addition, the two openings 78 arranged in the same part are arranged mirror symmetrically with respect to a center line L. This center line L intersects the axis of the driveshaft P and extends perpendicularly with respect to a separation plane T of the two sections. In each case one of the pistons 76, 77, here the piston bearing the reference numeral 76, is used for regulating the fluid lift quantity in the case of an acceleration, and the piston marked with the reference numeral 77 is used for regulating in the case of a deceleration. Here, diagonally opposite pistons regulate the same type of drive.

As represented in FIGS. 6a, b, c and in FIG. 7, the pump-side pressure plate and the motor-side pressure plate 5, 5' as well as the central control plate 30 have longitudinal channels 50, 31, which extend in a peripheral direction of the respective rotor 6, 6'. In addition, the pump-side control plate and the motor-side control plate 5, 5' in each case have at least one circular control opening 51 which is in hydraulically communicating connection with the vane pistons 60 of the rotor 6. Adjacent to the channels and openings 50/51 of the pressure plates 5, 5', pressure pads 50', 51' are arranged, in order to ensure an axial sealing between rotor and stator.

The longitudinal channels 50, 31 of the three plates 5, 5', 30 are preferably arranged in a line one behind the other. Here, each plate 5, 5', 30 preferably has four longitudinal channels 50, 31 evenly distributed over the periphery thereof. The pressure plates 5, 5' are arranged here in such a manner that they come to lie in the area of the regulation passage openings 78. These longitudinal channels 50, 31 are connected to the pump chamber, so that the two stator/rotor sets RS1 and RS2 are in hydraulically communicating connection. Due to the varying position of the stator 7, the size of the opening and thus the throughput amount can be varied.

As described above, it is possible to regulate how far the stator 7 is forced apart by the pressure of the pump fluid and also by the centrifugal force generated by the rotation thereof. Since the pump stator 7 and the motor stator 7' can be regulated separately, it is possible to obtain a continuously variable transmission by means of different spacings. For example, in the case of an acceleration, the oil pressure acting on the pump stator 7 is increased. When the regulator pistons 76 then push against the pump stator 7 for acceleration, the pressure is transmitted to the motor stator 7', which is forced apart in accordance with the regulation thereof. Deceleration occurs in the opposite direction. A corresponding acceleration is represented diagrammatically in FIG. 8, in which the arrows represent the oil flow.

The device according to the invention enables the inexpensive production of a continuously variable transmission which, in addition, is easy to regulate and has an optimized transmission of force.

LIST OF REFERENCE NUMERALS

P Pump shaft
M Motor shaft
G Housing
L Center line
T Separation plane
SR1 First vane cell stator/rotor set
SR2 Second vane cell stator/rotor set
1 Pump housing
10 Nose
2 Motor housing
3 Control housing
30 Central control plate
31 Longitudinal channel
4 Control pump
40 Inlet opening
41 Outlet opening
42 Control channel
5 Pump-side pressure plate
5' Motor-side pressure plate
50 Longitudinal channel
50' Pressure pad
51 Control opening
51' Pressure pad
6 Pump rotor
60 Vane
6' Motor rotor
7 Pump stator
70 Inner running surface
71 First part
72 Second part
73 Indentation
74 Nose
75 Return spring
76 Regulator piston for acceleration
77 Regulator piston for deceleration
78 Regulation passage openings
7' Motor stator

The invention claimed is:

1. A hydraulic torque converter, comprising:
a housing,
a first vane cell stator/rotor set arranged in the housing, with outer vane piston support, and
a second vane cell stator/rotor set arranged in the housing, with outer vane piston support,
a drive shaft having an axial direction,
an output shaft,
wherein each cell stator/rotor set comprises a rotor,
wherein each cell stator/rotor set comprises a stator,
wherein the rotor of the first vane cell stator/rotor set can be connected to the driveshaft, and the rotor of the second vane cell stator/rotor set can be connected to the output shaft,
wherein the first and second vane cell stator/rotor sets are in hydraulically communicating connection,
wherein the first and second vane cell stator/rotor sets are arranged one behind the other in the axial direction of the driveshaft and the output shaft,
wherein at least one of the stators has a spacing from the associated rotor which can be varied in at least one radial direction on the basis of pressure and/or centrifugal force, and
wherein spacing adjustment elements are provided for regulating the spacing from the associated rotor,
wherein the at least one of the stators with variable spacing consists of two sections the position of which with respect to one another can be varied on the basis of pressure and/or centrifugal force,
wherein four regulation passage openings are present, wherein two regulation passage openings of the four regulation passage openings are arranged in each of the two sections, the two regulation passage openings of one of the two sections are arranged diagonally opposite the two regulation passage openings of another of the two sections,
wherein the two regulation passage openings arranged in the same section are arranged mirror symmetrically with respect to a center line, wherein the center line intersects the axis of the driveshaft or output shaft and extends vertically with respect to a separation plane of the two sections, and
wherein a first of the two regulation passage openings of each section regulates an acceleration type of drive and wherein a second of the two regulation passage openings of each section regulates a deceleration type of drive, wherein the two regulation passage openings arranged diagonally opposite one another regulate the same type of drive.

2. The torque converter according to claim 1, wherein on one side of each of the two stator/rotor sets, a respective pump control plate or motor control plate is arranged,
wherein a central control plate is arranged between the two stator/rotor sets, and
wherein the pump control plate, the motor control plate and the central control plate comprise at least one longitudinal channel extending in the axial direction of the rotors, wherein the pump control plate and the motor control plate have control openings which extend centrally around the axis of the driveshaft or output shaft and which are in hydraulically communicating connection with vane pistons of the rotor.

3. The torque converter according to claim 1, wherein for all the stator/rotor sets, the spacing of the stator from the associated rotor can be varied on the basis of pressure and/or centrifugal force and can be regulated independently of one another.

4. The torque converter according to claim 1, wherein at least one of the stators with variable spacing has a circular running surface for the associated rotor arranged within the stator, wherein the circular shape of the running surface can be splayed in two diagonally opposite directions on the basis of pressure and/or centrifugal force.

5. The torque converter according to claim 4, wherein at least two sections of the stator are constructed symmetrically, and that each section has indentations which are in engagement with the indentations of the other section.

6. The torque converter according to claim 1, wherein the at least one of the stators with variable spacing consists of at least two sections the position of which with respect to one another can be varied on the basis of pressure and/or centrifugal force.

7. The torque converter according to claim 6, wherein the at least two sections of the stator are constructed symmetrically, and that each section has indentations which are in engagement with the indentations of the other section.

8. The torque converter according to claim 1, wherein the spacing adjustment elements comprise at least one return spring which applies force to the stator in a radial direction toward the axis of the driveshaft or output shaft.

* * * * *